Oct. 15, 1957  S. ELIOT  2,809,468
COMBINATION PLANT PROP AND FEEDER
Filed May 21, 1953
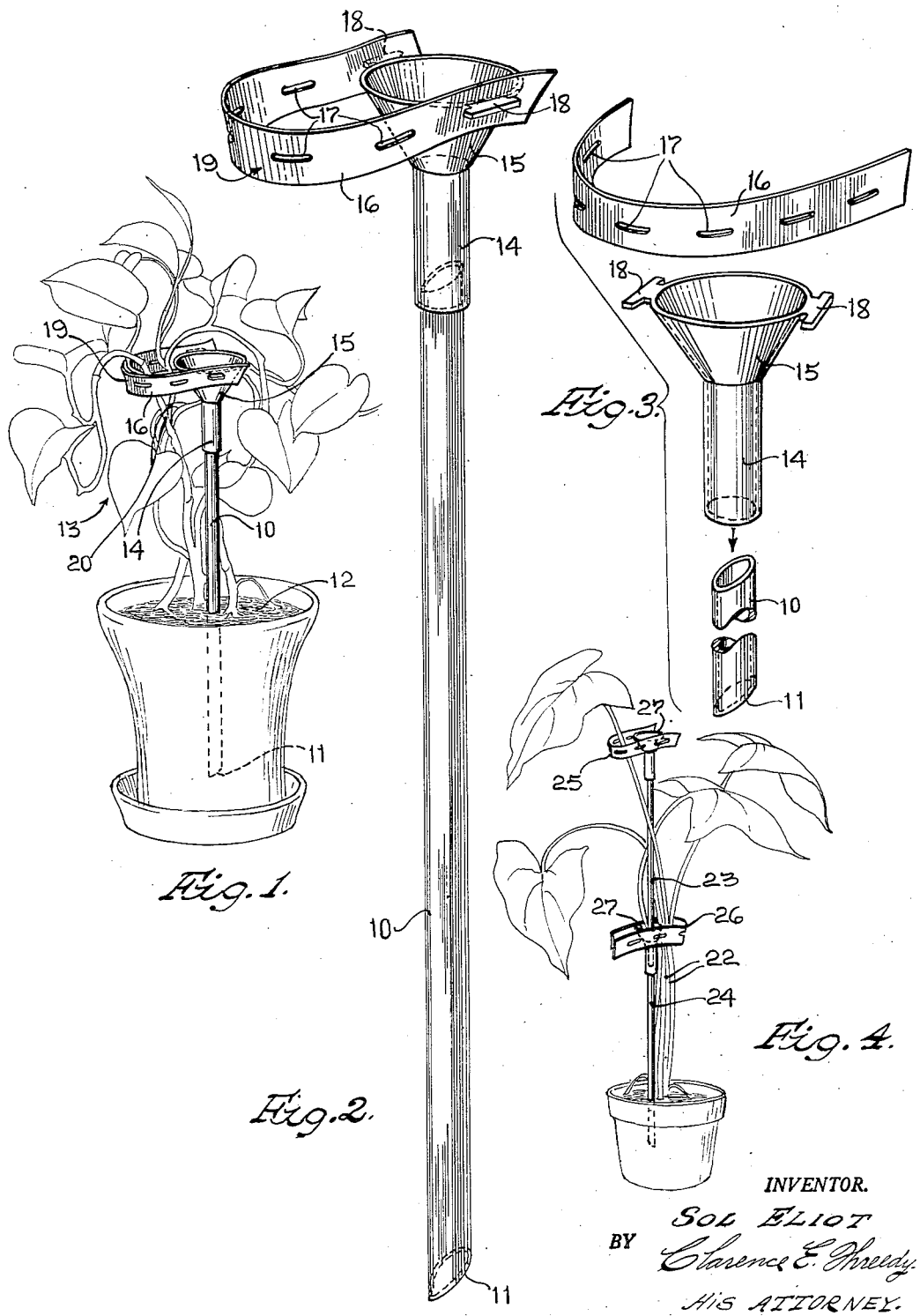
INVENTOR.
SOL ELIOT
BY Clarence E. Threedy.
HIS ATTORNEY.

United States Patent Office 2,809,468
Patented Oct. 15, 1957

2,809,468
COMBINATION PLANT PROP AND FEEDER

Sol Eliot, Chicago, Ill., assignor to Crest Specialty (Not Inc.), Chicago, Ill., a copartnership Application May 21, 1953, Serial No. 356,458

1 Claim. (Cl. 47—44)

This invention relates to a novel combination plant prop and feeder especially adapted for use in connection with household or domestic plants for feeding and supporting the plant.

One of the many objects of the invention is to provide a combination plant prop and feeder which is relatively simple in construction and economical in manufacture.

Another object of the invention is to provide an arrangement to facilitate the watering and feeding of plant food to the plant.

Yet another object of the invention is to provide a simple arrangement for tying the plant stem to a prop mounted in the pot or box containing the plant roots.

Another object of the invention is to provide a tie strap for the purposes hereinafter described and which comprises a pliable or foldable elongated member having a plurality of perforations spaced in its longitudinal direction, whereby the strap may be properly adjusted with respect to a prop to support a plant stem or the like.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a plant showing my invention associated therewith;

Fig. 2 is a perspective view of my improved combination plant prop and feeder;

Fig. 3 is a perspective view of the parts of my novel prop and feeder showing the parts in exploded relation with respect to each other;

Fig. 4 is a perspective view of two of my novel combination plant props and feeders arranged in extended relation with respect to each other to accommodate a tall plant.

The several objects of my invention may be accomplished by the preferred form of construction shown in the accompanying drawings. In this connection, my novel plant prop and feeder comprises an elongated tube 10. This tube is substantially rigid in construction and may be formed of any suitable material or color and may be transparent, if desired. The opposite ends of this tube are tapered transversely and outwardly as at 11 to facilitate the projection of either end of the tube into the soil 12 surrounding the plant 13.

The end of the tube opposite to that which is projected into the soil 12, is projected into a sleeve 14 preferably formed of expansible or pliable material of any color and transparent, if desired. The inside diameter of this sleeve 14 is slightly less than the outside diameter of the tube whereby to effect frictional connection between the sleeve and the end of the tube projected therein. This sleeve terminates into a frusto-conically shaped extension 15 formed of substantially the same material as the sleeve 14 and preferably formed integral therewith.

A tie strap is indicated at 16 and is preferably formed of expansible and pliable material and of a color to match that of the tube 10. In this tie strap 16 are formed a plurality of elongated perforations or slots 17 spaced from each other as shown. These perforations are adapted to have projected therethrough substantially T-shaped lugs 18. These lugs 18 are formed preferably as an integral part of the extension 15. The tie strap 16 is foldable to form a loop 19 which embraces the stem or stems 20 of a plant 21. By providing a plurality of elongated perforations 17, the tie strap 16 may be adjusted to provide a loop of proper length to accommodate plants of various sizes.

In Fig. 4, I have illustrated the use of my novel plant prop and feeder, for supporting a plant having relatively long stems 22. In this connection, the sleeve 14 is utilized to frictionally connect together two tubes 23 and 24 each of a construction similar to that of the tube 10. In this use of my invention there are utilized straps 25 and 26 of a construction similar to that of the strap 16 and connected to the frusto-conically shaped extensions 27 in a manner similar to that shown in Fig. 2. It is understood that any number of tubes may be employed to accommodate the height of the plant.

By forming the extension 15 of the sleeve 14 frusto-conical, watering or feeding of plant food to the plant is substantially facilitated and the splashing or dripping of water on adjacent surfaces is prevented.

It will be seen that my improved plant prop and feeder comprises relatively few parts, is easy of assembly and may therefore be manufactured at an economical cost.

In assembled form my combination plant prop and feeder is decorative, greatly adding to the appearance of the plant and presenting to the eye a pleasing effect. It will be apparent that by reason of the pliability or flexibility of the strap 16, injury to the plant is prevented, and the growth of the plant by reason of the use of my novel plant prop is substantially strengthened.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A combination plant prop and feeder comprising an elongated substantially rigid tube, a removable sleeve into which one end of the tube projects and having an inside diameter sufficient to effect detachable frictional connection with said end of the tube, a frusto-conical extension on the outer end of the sleeve, a tie strap foldable to provide a loop, and means tangentially connected on opposite points of the circumference of said extension for connecting the opposite end portions of the tie strap to said extension with the loop arranged in a substantially horizontal plane, the opposite ends of said tube being beveled transversely and outwardly to facilitate projection of said one end of the tube into said sleeve and the opposite end of the tube into a pot or the like of dirt, or into the frusto-conical extension of a like sleeve of another tube to provide a plant prop and feeder of various heights.

References Cited in the file of this patent
UNITED STATES PATENTS

| | | |
|---|---|---|
| 500,140 | Kruger | June 27, 1893 |
| 1,586,676 | Heath | June 1, 1926 |
| 1,628,249 | Kirfman | May 10, 1927 |
| 1,758,839 | Kelsey | May 13, 1930 |
| 2,152,018 | Barnhart | Mar. 28, 1939 |

FOREIGN PATENTS

| | | |
|---|---|---|
| 202,146 | Germany | Sept. 26, 1908 |